June 25, 1968  J. JACOBS III  3,389,603
LIQUID LEVEL RESPONSIVE DEVICE
Filed June 16, 1966
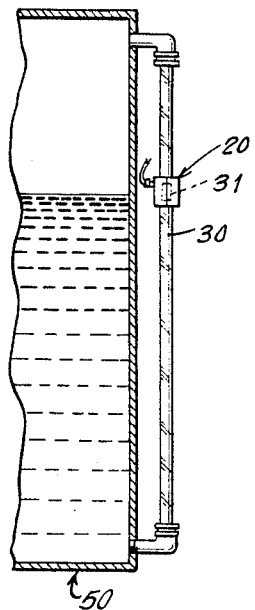
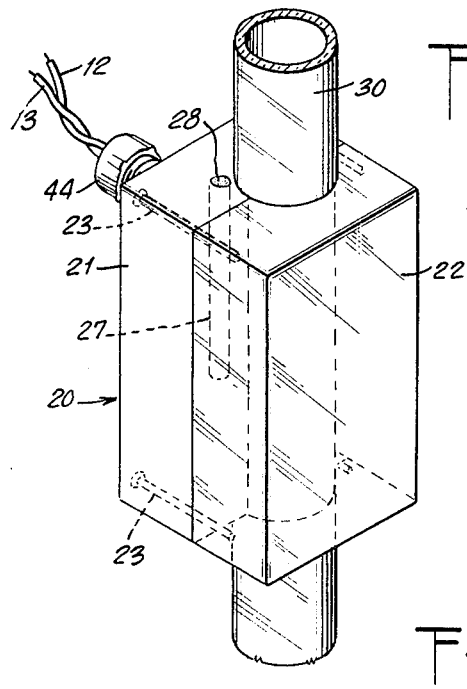
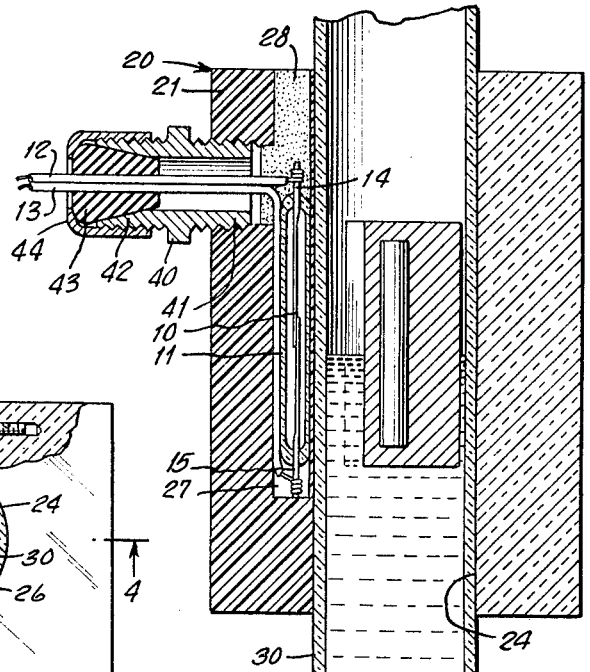
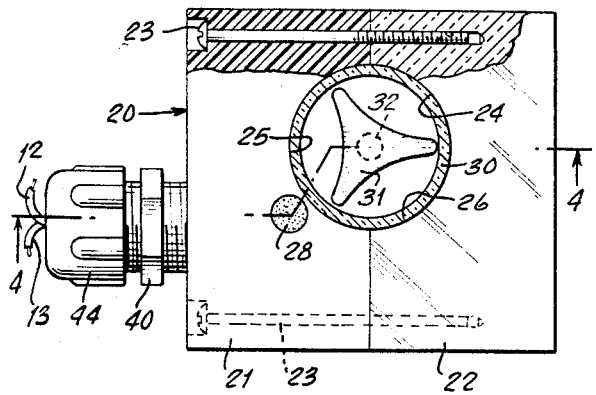
INVENTOR.
JOHN JACOBS III
BY
*Thomas F. Moran*
ATTORNEY United States Patent Office 3,389,603
Patented June 25, 1968

3,389,603
LIQUID LEVEL RESPONSIVE DEVICE
John Jacobs III, Darien, Conn., assignor to Sonic Engineering Corporation, Fairfield County, Conn., a corporation of Connecticut
Filed June 16, 1966, Ser. No. 557,972
2 Claims, (Cl. 73—308)

ABSTRACT OF THE DISCLOSURE

A liquid level controller or a device responsive to the level of a liquid within a sight glass is provided by a reed switch encapsulated within a glass envelope which, in turn, is provided and sealed within an adjustable housing. The housing is made up of two parts, one part being transparent and the parts being contoured so as to be adjustably fitted around the sight glass. A magnetic float is provided within the sight glass responsive to the liquid level therein such that when the magnetic float comes opposite the reed switch the reed switch is actuated.

---

This invention relates to devices responsive to the level of a liquid. More particularly, this invention relates to devices for measuring liquid level and responsive to changes in said level. More specifically, this invention relates to devices useful in conjunction with liquid level sight glasses to provide a set point to control said level in the sight glass and in the vessel to which the sight glass is connected, and operable in atmospheres which are corrosive, flammable or explosive.

In this invention, a magnet is disposed within a float which is in turn disposed within a sight glass. An electrical reed switch is encapsulated in a glass envelope and the glass envelope is embedded within a solid housing in order to protect said switch from misuse and corrosive or flammable atmospheres. The housing adjustably clamps along the sight glass and has a transparent portion through which the sight glass may be read. The magnet within the sight glass is of sufficient strength to open and close the reed switch as its position varies with the liquid level. Electrical conductors or leads connected to the ends of the reed switch and are embedded in and extend through the housing where they may be attached or electrically connected to various devices.

The use of a magnet floating within a sight glass to affect an adjacent electrical element and thereby read the level of the liquid in the sight glass, is known. However, the housing for such elements has not been adequate to permit their use in corrosive or explosive atmospheres. In the present invention, the encapsulation of the element, a reed switch, within a glass envelope which is in turn embedded within the housing prevents corrosion of the element; at the same time, the embedding of the electrical connections within the housing permits the device to be used in flammable or explosive atmospheres by eliminating any dangerous effects due to sparking.

Accordingly, it is an object of this invention to provide an improved liquid level response device.

It is another object of this invention to provide an improved device to measure liquid levels and to respond to changes therein.

A further object of this invention is to provide an improved device which will respond to a change in the level of a liquid within a sight glass by activating a valve, a signaling device, a pump or other device.

How these and other objects of this invention are achieved will become apparent in the light of the accompanying disclosure made with reference to the accompanying drawing in which:

FIG. 1 is a view of the present invention illustrating a possible use to control the level of a liquid in a vessel;

FIG. 2 is a perspective view of the device of the invention clamped about a length of a sight glass tubing;

FIG. 3 is a plan view in partial cross section of the arrangement illustrated in FIG. 2; and FIG. 4 is a view along the line 4—4 of FIG. 3.

A reed switch 10, comprised of two elongated electrically conductive members which overlap for a fraction of their respective lengths and are normally separated by a short gap, is encapsulated in a cylindrical envelope 11. The envelope may be made of glass, as illustrated in the embodiment shown, and may be evacuated or filled with an inert gas. The members of the reed switch are made of magnetically sensitive material, such as a ferrous alloy. Each member extends through an end of the envelope 11, and electrical wires 12 and 13, are connected to the respective end portions 14 and 15 of the members.

A housing 20 for the reed switch 10 may be made of a plastic material, such as Lucite, and has an opaque portion 21 and a transparent portion 22. Housing 20 has a longitudinal dimension greater than that of the reed switch 10. In the embodiment shown, the two portions of the housing are approximately equal in size and are symmetrical; that is about one-half of the housing is transparent. The two portions are held together in abutting contact by a plurality of screws 23. A bore or hole 24 is made longitudinally through the housing to receive a sight glass. It may be made in any cross section so long as its interior surface follows the contour of the sight glass with which the present invention is intended to be used. Its cross-setcional size should be substantially equal to the outer dimensions of the sight glass. For purposes of illustration, hole 24 has been illustrated in the embodiment shown as cylindrical since this is a common sight glass shape. As best illustrated in FIG. 3, hole 24 may be formed by the alignment of two channels 25 and 26, here semicylindrical, in housing portions 21 and 22 respectively. The axis of each channel lies in the portion's surface which is in abutment with the corresponding surface of the other portion. These axes need not be located along the center line of each abutment surface, as long as they are located so as to be in alignment when portions 21 and 22 are screwed together. In addition, housing 20 may be designed with hole 24 more or less within one or the other of the portions 21 and 22, rather than in each equally, as illustrated.

The two portions 21 and 22 clamp around the sight glass 30, said sight glass positioned within hole 24 which has been designed to receive it. Because one portion of the housing, here illustrated as 22, is transparent, the length of sight glass 30 encompassed by the housing and the level of the liquid within said sight glass are visible outside the housing. When housing 20 is clamped about sight glass 30 in the above manner, it is self-supporting, and its position along sight glass 30 may be adjusted. Such an adjustment may be made by loosening screws 23 to permit housing 20 to slide along the sight glass 30 to the desired position and then re-tightening the screws 23 to clamp the housing securely to the sight glass. Alternatively, the adjustment may be made or the device positioned on a different sight glass, by disengaging screws 23 from one-half of the housing, separating the two portions 21 and 22 of the housing, positioning the two portions at the desired location and re-engaging screws 23.

Envelope 11, which contains reed switch 10, is embedded within the housing 20, preferably in the opaque portion 21. It is positioned adjacent to and parallel with hole 24, and is located so that the end portions 14 and 15 of the switch and their respective connections to wires 12 and 13 are also embedded in housing 20. A small cylindrical cavity 27 may be formed within housing 20 to receive envelope 11, after which the cavity is tightly sealed with plastic plug 28. Alternatively, portion 21 of the housing may be molded about envelope 11 during manufacture of the device. By being embedded in the housing in this manner, reed switch 10, and especially the end portions 14 and 15 thereof, are protected against corrosive atmospheres, permitting the use of this invention under such conditions.

Within sight glass 30 is a float 31. Float 31 may be formed in any of the common shapes known in the art. Located within float 31 is a magnet 32, positioned with its N-S axis approximately parallel to the reed switch 10. Float 31 varies in position with the level of the liquid in sight glass 30 and magnet 32 is of sufficient strength to open and close reed switch 10.

Electrical wires 12 and 13 run from their respective connections with the ends 14 and 15 of the reed switch through the outer surface of housing 20. In order to completely seal off these connections from the ambient atmosphere which may be flammable, explosive or corrosive, they are passed through a metal sleeve 40 which has screw threads on both of its ends 41 and 42. End 41 is screwed into appropriate threads provided in the wall of the housing about the point at which wires 12 and 13 emerge. The wires are next passed through a rubber bushing 43 and the center of a cylindrical metal cap 44, said cap having interior threads. Cap 44 is screwed onto end 42 of the metal sleeve so as to engage bushing 43 and compress it. The wires are attached to various electrical devices such as valves, pumps, etc., normally utilized in conjunction with a system of flowing fluid, and to a source of power.

In its normal position in accordance with the illustrated embodiment of the invention, reed switch 10 is open, that is, there is a small gap between the members of the switch. The strength of the power source and the nature of the devices wired into the circuit containing electric wires 12 and 13 are chosen in view of the design of this gap so that the gap is sufficient to inhibit the flow of electrical current through the circuit. When the level of the liquid in sight glass 30 is such that float 31 and magnet 32 are adjacent to reed switch 10, the field of the magnet causes the members of the switch to move into contact with each other, closing the gap. This action results in a closing of the electrical circuit, so that the various devices connected into said circuit begin to operate.

For example, if sight glass 30 is mounted on the side of a vessel 50, as illustrated in FIG. 1, housing 20 is positioned on the sight glass to be located at the desired liquid level in vessel 50. If it is desired to keep the liquid level in the vessel below this point, a valve at the bottom of the vessel or a pump with its intake connected to the lower portion of the vessel is wired into the circuit containing wires 12 and 13. Should the level in vessel 50 rise, the level in sight glass 30 will vary correspondingly and the float 31 and magnet 32 will be carried into the region of reed switch 10, closing the gap in the switch and activating the valve or pump to reduce the level of the vessel in 50. By an analogous assembly, the present invention may be used to insure that the level in vessel 50 does not fall below the point at which housing 20 is positioned.

Numerous modifications and adaptations of the liquid level response device of this invention will be readily apparent to those skilled in the art. Thus it is intended by the appended claims to cover all such modifications and adaptations as fall within the true spirit and scope of the appended claims.

I claim:
1. A device responsive to the level of a liquid in a sight glass comprising:
  (a) a housing adjustable in position along a length of said sight glass and encompassing a portion of said sight glass and having an opaque portion and a transparent portion through which said sight glass and liquid level therein are visible;
  (b) a reed switch encapsulated in a glass envelope except for the outer ends of said switch which protrude through said envelope, said envelope and said outer ends of said switch being embedded within the opaque portion of said housing;
  (c) electrical connections from said outer ends of said reed switch embedded within the opaque portion of said housing and extending outside of said housing, said electrical connections passing through the wall of the opaque portion of said housing, a metal sleeve, a rubber bushing inserted on the end of said sleeve and a metal cap, said cap being screwed onto the metal sleeve so as to engage said bushing in compression; and
  (d) a magnet disposed within a float within said sight glass, said float varying in position with the level of of the liquid in the sight glass, said magnet being of sufficient strength to open and close said reed switch as the liquid level within said sight glass varies.

2. A device as defined in claim 1 in which said portions of said housing are held together in abutting contact by means of screws and are substantially symmetrical with regard to each other, each having a longitudinal channel lying in the surface which is in abutment with said other half, said channels being positioned so as to be in alignment with each other so as to form a hole, said hole having a cross section substantially the same as the cross section of said sight glass.

References Cited
UNITED STATES PATENTS

| | | | |
|---|---|---|---|
| 2,503,089 | 4/1950 | Binford | 200—84.3 |
| 2,719,196 | 9/1955 | Wright. | |
| 2,976,378 | 3/1961 | Goddard | 200—84.3 X |
| 3,024,659 | 3/1962 | White | 73—290.1 |
| 3,114,478 | 12/1963 | Hilkemeier et al. | 73—308 |
| 3,145,277 | 8/1964 | Senn | 200—84.3 |

DAVID SCHONBERG, *Primary Examiner.*

LOUIS R. PRINCE, *Examiner.*

D. M. YASICH, *Assistant Examiner.*